(No Model.)

W. LANGMUIR.
VEHICLE TIRE.

No. 496,418. Patented May 2, 1893.

Witnesses
J. Edw. Maybee
W. J. McMillan

Inventor
Woodburn Langmuir
by Donald C. Ridout & Co
Attys.

UNITED STATES PATENT OFFICE.

WOODBURN LANGMUIR, OF TORONTO, CANADA.

VEHICLE-TIRE.

SPECIFICATION forming part of Letters Patent No. 496,418, dated May 2, 1893.

Application filed August 5, 1892. Serial No. 442,256. (No model.)

*To all whom it may concern:*

Be it known that I, WOODBURN LANGMUIR, of the city of Toronto, in the county of York, in the Province of Ontario, Canada, have invented a certain new and Improved Vehicle-Tire, of which the following is a specification.

The invention relates to an improved rubber tire specially adapted for pleasure vehicles used upon asphalt and other pavements, and the object of the invention is to provide a tire which will combine the strength of a metal tire with the noiseless and smooth riding qualities of a rubber tire, and it consists, essentially, of a tire composed of a metal band bolted or otherwise secured to and substantially in the center of the felly, and an integral rubber ring stretched over the felly so as to entirely envelop the metal band, substantially as hereinafter more particularly explained.

Figure 1:
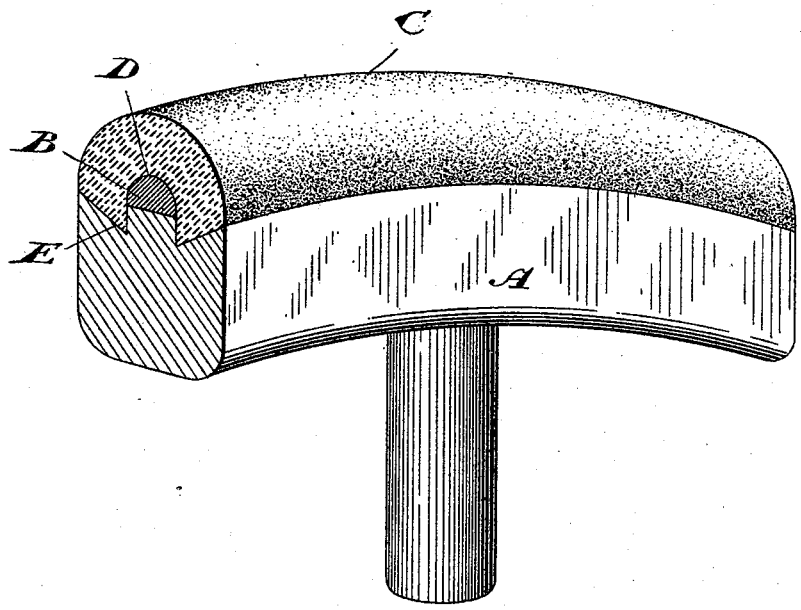
Figure 2:
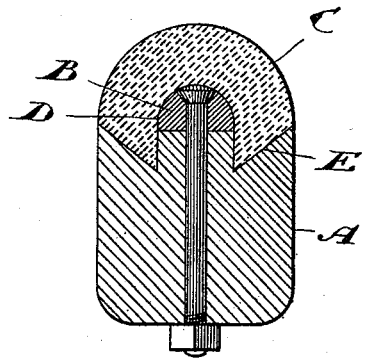

Figure 1, is a perspective view of a section of my improved tire. Fig. 2, is a cross-section of the felly with the tire in position.

In the drawings, A is an ordinary felly, and B a metal band bolted or otherwise secured to the felly substantially in its center, as shown.

C, is a rubber ring stretched upon the felly A, so as to entirely envelop the central band B. To better effect that purpose, I make a groove D, around the inside circumference of the ring C, the said groove being made the exact size of the band B.

In order to better secure the rubber ring C, in position I prefer to make a recess E, in the outer circumference of the felly on each side of the band B, and I shape the inner circumference of the ring C, so as to inversely correspond with and fit the recesses E.

I prefer to make the rubber ring C, smaller in diameter than the felly A, so that the said ring must be stretched in order to fit the felly A, and thus by its contraction, the rubber ring C, is securely held in position.

By employing the metal band, the felly is rigidly held together and as the rubber ring C, entirely envelops the metal band, the said metal band is completely protected from the heat of the sun and will, therefore, not expand or loosen by the heat. By thus providing a rubber tire constructed as described, I have a tire which will be perfectly noiseless and yet will hold the wheel strongly together.

What I claim as my invention is—

1. As an improved tire, a metal band bolted or otherwise secured to the felly, an integral rubber ring made smaller than the felly and stretched thereon so as to hug the felly and envelop the metal band, substantially as and for the purpose specified.

2. As an improved tire, a metal band bolted or otherwise secured to and substantially in the center of the felly, a rubber ring having a groove made in its interior circumference to fit over the metal band, the said rubber ring being stretched upon the felly, substantially as and for the purpose specified.

3. As an improved tire, a metal band bolted or otherwise secured to and substantially in the center of the felly, a rubber ring having a groove made in its interior circumference to fit over the metal band and projections on each side of the groove to fit into recesses made in the circumference of the felly, substantially as and for the purpose specified.

Boston, July 5, 1892.

WOODBURN LANGMUIR.

In presence of—
JOS. A. CAMPBELL,
ALLISON B. BROWN.